United States Patent [19]
Branecky

[11] Patent Number: 6,153,956
[45] Date of Patent: Nov. 28, 2000

[54] SWITCHED RELUCTANCE POSITION SENSING

[75] Inventor: Brian T. Branecky, Oconomowoc, Wis.

[73] Assignee: A. O. Smith Corporation, Milwaukee, Wis.

[21] Appl. No.: 09/397,547

[22] Filed: Sep. 16, 1999

[51] Int. Cl.[7] ........................................ H02P 5/05
[52] U.S. Cl. ........................... 310/68 B; 318/701
[58] Field of Search ................... 318/701, 254, 318/700, 138; 310/68 B

[56] References Cited

U.S. PATENT DOCUMENTS

| | | | |
|---|---|---|---|
| 4,777,419 | 10/1988 | Obradovic | 318/696 |
| 5,097,190 | 3/1992 | Lyons et al. | 318/701 |
| 5,140,243 | 8/1992 | Lyons et al. | 318/701 |
| 5,410,235 | 4/1995 | Ehsani | 318/701 |
| 5,461,295 | 10/1995 | Horst | 318/701 |
| 5,467,025 | 11/1995 | Ray | 318/701 |
| 5,475,289 | 12/1995 | McLaughlin et al. | 318/432 |
| 5,525,886 | 6/1996 | Lyons et al. | 318/701 |
| 5,525,887 | 6/1996 | Van Sistine | 318/701 |
| 5,537,019 | 7/1996 | Van Sistine et al. | 318/701 |
| 5,627,445 | 5/1997 | Webster | 318/701 |
| 5,689,165 | 11/1997 | Jones et al. | 318/701 |
| 5,691,591 | 11/1997 | McCann | 310/198 |
| 5,793,179 | 8/1998 | Watkins | 318/701 |
| 5,867,004 | 2/1999 | Drager et al. | 318/701 |

*Primary Examiner*—Burt Mullins
*Attorney, Agent, or Firm*—Michael Best & Friedrich LLP

[57] ABSTRACT

An apparatus and method of determine rotor position for a switched reluctance motor is claimed. A phase voltage and a phase current are measured. An estimated flux voltage value is determined from the measured phase voltage and the phase current. The phase current is again measured when the estimated flux linkage value is approximately equal to a reference flux linkage value. Rotor position is determined based on the reference flux linkage value and the measured phase current value.

35 Claims, 3 Drawing Sheets

SWITCHED RELUCTANCE POSITION SENSING

BACKGROUND

This invention relates to a switched reluctance ("SR") motor. More particularly, the invention relates to a method and apparatus for determining rotor position of a switched reluctance motor.

SR motors have multiple poles on both the stator and the rotor. There are windings or coils wound out of the stator poles and each pair of windings on diametrically opposite stator poles are connected in series to form an electrically independent phase of the SR motor. There are no windings or magnets on the rotor. However, the rotor is made of a magnetically permeable material such as, for example, a ferrous alloy.

In order to start and run an SR motor, it is necessary to determine the position of the rotor with respect to the stator. The position of the rotor with respect to the stator establishes which phase of the stator is energized or commutated first. If the position of the rotor is not correctly determined, commutation of one of the stator phases may result in inefficient operation of the motor.

Many conventional sensors for determining rotor position are bulky, unreliable and expensive. Further, many methods used to determine rotor position require finding the peak of the current waveform.

SUMMARY OF THE INVENTION

When operating an SR motor in single-pulse mode, rotor position can be detected by determining the peak of the current waveform. The peak of the current waveform generally corresponds to a given rotor position. By determining the rotor position at the peak of the current waveform, the actual rotor position may be extrapolated using motor geometry. A problem encountered when an SR motor is operated in single pulse mode is that the voltage does not always remain constant. When the voltage is not constant, a peak in the current waveform (for that cycle) may not occur. If a peak in the current waveform does not occur, rotor position cannot determined for that cycle using a peak current detection method. Thus, a current waveform peak detection method requires that the voltage remain relatively constant in order for the results to be accurate.

Another problem encountered in using the peak detection method is that current is required to be in the windings before the start of the peak of the current waveform. Thus, to overcome the limitations and restrictions of having to determine a peak of the current waveform, a new position-sensing scheme is needed to eliminate the need for determining the peak of the current waveform.

Accordingly, the invention provides a switched reluctance motor including a controller for the switched reluctance motor and a method of determining rotor position in the switched reluctance motor. The controller includes a measuring circuit, a comparing circuit, a look-up table and an estimating circuit. The method includes measuring a flux voltage value and a phase current value, determining a monitored flux voltage value from the flux voltage value and the phase current value, measuring the phase current when the monitored flux voltage value is approximately equal to a stored flux voltage value, and determining the rotor position based on the monitored flux voltage value and the measured phase current.

A principal advantage of the invention is the provision of a controller that determines rotor position without requiring detection of the peak of the current waveform.

Another advantage of the invention is the provision of a controller that does not constantly monitor the current, but only takes a current measurement when the estimated flux voltage value is approximately equal to the flux reference value.

Another advantage of the invention is the provision of a controller that maintains a table of estimated flux values for given current values in software.

Other features and advantages of the invention will become apparent to those skilled in the art upon review of the following detailed description, claims and drawings.

Figure 1:
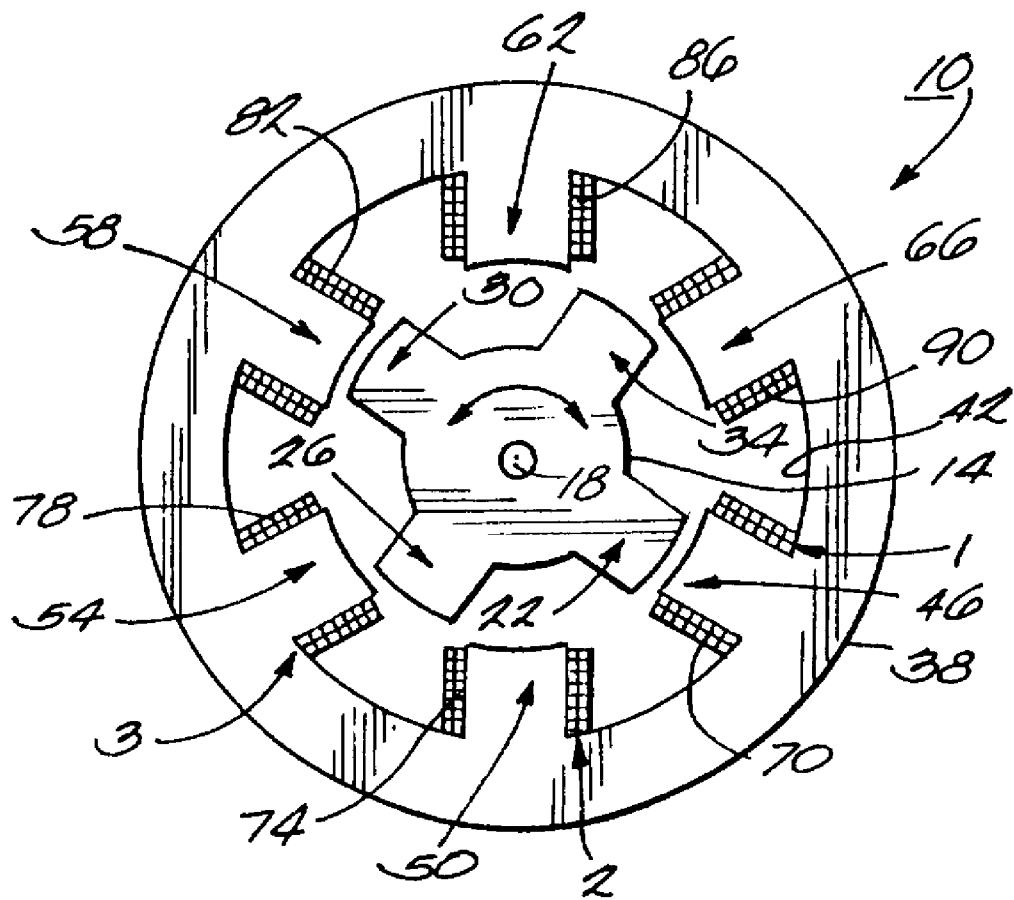
FIG. 1 is a simplified cross-sectional representation of a switched reluctance motor showing the stator and the rotor of the switched reluctance motor.

Before one embodiment of the invention is explained in detail, it is to be understood that the invention is not limited in its application to the details of the construction and the arrangement of the components set forth in the following description or illustrated in the drawings. The invention is capable of other embodiments and are carried out in various ways. Also, it is understood that the phraseology and terminology used herein is for purpose of description and should not be regarded as limiting.

DETAILED DESCRIPTION OF THE PREFERRED EMBODIMENT

Shown in FIG. 1 of the drawings is a schematic view of a switched reluctance motor 10 embodying the invention. The switched reluctance motor 10 includes a rotor 14 mounted for rotation about an axis 18. The rotor 14 includes four rotor poles 22, 26, 30 and 34. The rotor poles 22, 26, 30, and 34 are evenly spaced about the axis 18 and extend radially outward from the rotor 14 relative to the axis 18.

The motor 10 also includes a stator 38 surrounding the rotor 14. The stator 38 has an inner surface 42 and 6 stator poles 46, 50, 54, 58, 62 and 66, extending from the inner surface 42 inwardly toward the rotor axis 18. The stator poles 46, 50, 54, 58, 62 and 66 are evenly spaced about the inner surface 42 of the stator 38. Because the motor 10 includes 6 stator poles and 4 rotor poles, the switched reluctance motor 10 shown in FIG. 1 is referred to as a 6/4 (6 stator pole to 4 rotor pole ratio) switched reluctance motor. While the description will refer to the operation of the invention in terms of a 6/4 SR motor, it should be understood that any switched reluctance motor having any number of stator poles or rotor poles can be just controlled with the circuit disclosed herein.

The SR motor 10 also includes windings or coils 70, 74, 78, 82, 86 and 90, on the stator poles 46, 50, 54, 58, 62 and 66, respectively. The windings are made of a conductor of a precise gauge which is wound around the stator pole a precise number of times or turns. The gauge of the wire and the number of turns vary depending upon the application. The description applies equally to any SR motor using any gauge wire or having any number of turns.

The windings 70, 74, 78, 82, 86 and 90, on diametrically opposite stator poles 46, 50, 54, 58, 62 and 66, respectively, are connected in series to form three electrically independent phases 1, 2 and 3 of the SR motor 10. As shown in FIG. 1, the windings 70 and 82 on stator poles 46 and 58, respectively, form pole pairs which together form phase 1. The windings 74 and 86 on stator poles 50 and 62, respectively, form pole pairs which together form phase 2. The windings 78 and 90 on stator poles 54 and 60, respectively, form pole pairs which together form phase 3. Because the rotor 14 is made of ferromagnetic material, energizing a particular phase of the motor 10 results in the formation of a magnetic attraction between the windings on the stator pole pairs comprising the energized phase and the rotor poles closest to the stator poles of the energized phase. By energizing the phases in a particular manner, the rotational direction and speed of the rotor can be precisely controlled.

The circuit of the invention processes data to estimate rotor position without the need to determine a peak of the current waveform. A measuring circuit continually monitors a phase voltage and a phase current. A flux estimator circuit comprises a subtraction circuit and an integrator to determine the flux across a coil. A comparing circuit is connected to the measuring circuit, and comprises a comparator. The comparator processes the flux voltage and flux current data, and compares the estimated flux linkage value with a reference flux linkage value. A phase current is then measured when the estimated flux linkage value is approximately equal to the reference flux value. The measured phase current at that particular flux value is then input into a look-up table, preferably in software, along with a flux level control signal. The look-up table contains values of shaft angles for corresponding phase current and stored flux values. The lookup table processes the measured phase current and flux level control signal data, and outputs a shaft angle to an estimating circuit. The estimating circuit comprises an integrator, which processes the shaft angle data and integrates the shaft angle data with data representing the speed of the motor. This integration results in data representing an estimated rotor position.

Figure 2:
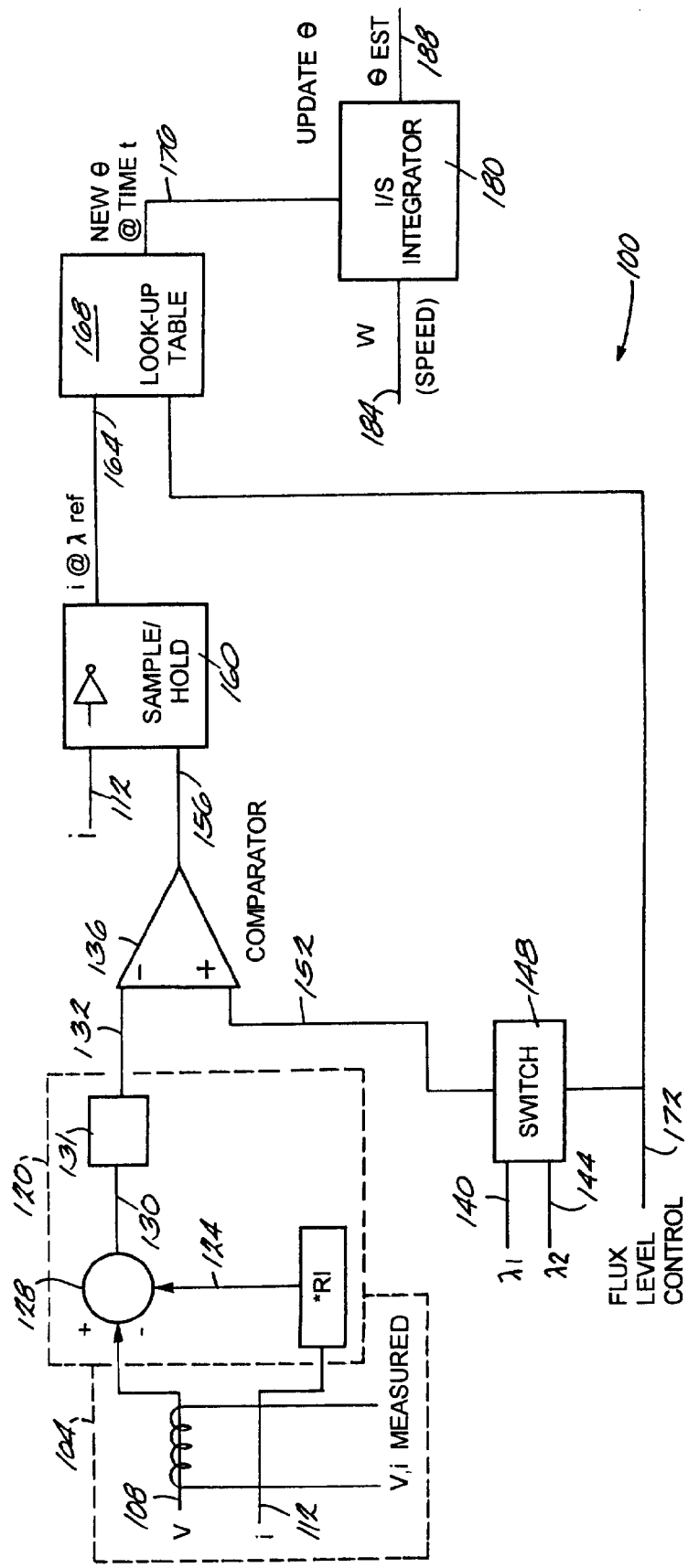
FIG. 2 is a schematic diagram of the electronic controller for energizing the switched reluctance motor.

FIG. 2 is a schematic diagram of an electronic circuit 100 for a SR motor of the invention. In operation, a measuring circuit 104 measures the phase voltage (v) 108 and the phase current (i) 112. The phase current and the phase voltage are continually monitored. In a preferred embodiment, the phase voltage and phase current are measured approximately every 50 microseconds. The phase voltage can be measured directly at the terminals of the motor, or by a command given to the motor voltage control circuitry. The phase current is measured using a single current sensor. The phase current 112 is then multiplied by an estimated resistance R1, resulting in an estimated voltage value 124.

The estimated voltage value 124 and the phase voltage value 108 are input into a flux estimator circuit 120, comprising a subtraction circuit 128 and an integrator 131. Input of the estimated voltage value 124 into the subtraction circuit 128 results in a voltage value 130 representing the voltage used to generate flux. The voltage used to generate flux value 130 is input into the integrator 131, which converts the voltage into an estimated flux value 132. In another embodiment, the flux linkage value 132 may be measured instead of estimated. The integrator 131 outputs the estimated flux linkage value 132 to a comparator 136. The comparator 136 compares the estimated flux linkage value 132 with either a first flux linkage reference value 140 or a second flux linkage reference value 144. Either the first flux linkage reference flux value 140 or the second flux linkage reference value 144 is selected via a switch 148, outputting the reference flux linkage value 152 to the comparator 136 to be compared with the estimated flux linkage value 132. When the estimated flux linkage value 132 is approximately equal to the reference flux linkage 152, a match control signal 156 is output from the comparator 136 to a sampler 160.

When the match control signal 156 is input into the sampler 160, measurement of the phase current 112 (and 164) is again triggered at that particular flux value. The measured phase current 164 is then input into a look-up table 168, along with a flux level control value 172. The flux level control value signal 172 is sent to the look-up table 168 and indicates whether the first flux linkage reference 140 or the second flux linkage reference 144 was selected from the switch 148. The look-up table 168 contains at least one set of two dimensional tables stored in memory. In a preferred embodiment, the look-up table contains two sets of two dimensional tables stored in memory: one set has stored values of the first flux linkage reference 140 and phase current 164 for corresponding shaft angles 176, and the second set has stored values of the second flux linkage reference 144 and phase current 164 for corresponding shaft angles 176. The look-up table may be maintained in hardware or in software. In a preferred embodiment, the look-up table is maintained in software.

Upon selection of an appropriate shaft angle from the look-up table 168, the shaft angle 176 is output from the look-up table 168 and is input into a second integrator 180. The second integrator 180 integrates the shaft angle 176 with a measurement of the motor speed 184, to output a new rotor position 188.

Figure 3:
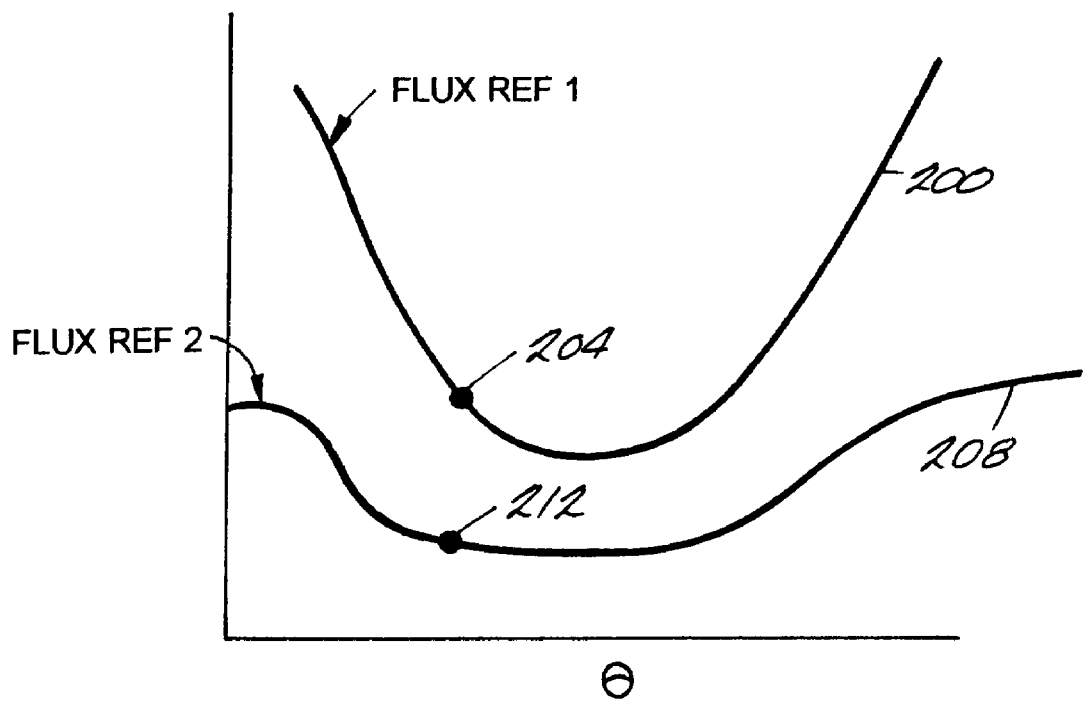
FIG. 3 is a graph illustrating phase current versus shaft angle.

Selection of the look-up table 168 depends on whether the first flux linkage reference 140 or the second flux linkage reference 144 is selected from the switch 148. Selection of the appropriate two-dimensional look-up table 168 is dependent on the relationship of the phase current 112 to the shaft angle 176. FIG. 3 illustrates a graph of shaft angle versus phase current for given flux linkage values. Ideally, a point on the phase current to shaft angle curve for a given flux linkage, either first or second reference flux linkage, is selected where the curve is not relatively flat; i.e., having a high slope value. As such, there is a distinct shaft angle corresponding to a given phase current. This is illustrated in FIG. 3 on curve 200 as point 204. If the current is relatively flat, i.e., having a low slope value, there may be many phase current values corresponding to the same or similar shaft angle. Curve 208 illustrates such a curve. As indicated on curve 208, point 212 is on a relatively flat portion of the curve 208, and accordingly, there are many phase current values corresponding to similar shaft angles. Thus, the appropriate curve, i.e., having a high slope value for a given phase current, is chosen from the look-up table.

Other features and advantages of the invention are set forth in the following claims.

What is claimed is:

1. A method of determining rotor position of a switched reluctance motor, the motor operating at a speed, the method comprising the acts of:

measuring a phase voltage;

measuring a phase current;

determining an estimated flux linkage value from the phase voltage and the phase current;

measuring the phase current when the estimated flux linkage value is approximately equal to a reference flux linkage value;

determining a shaft angle based on the reference flux linkage value and the measured phase current value; and determining rotor position based on the shaft angle and the speed.

2. The method as set forth in claim 1, wherein the reference flux linkage value is a first reference flux linkage value.

3. The method as set forth in claim 2, wherein the reference flux linkage value look-up table selected is based on the slope of the first reference flux linkage value to phase current value curve being greater than the slope of the second reference flux linkage value to phase current value curve.

4. The method as set forth in claim 1, wherein the reference flux linkage value is a second reference flux linkage value.

5. The method as set forth in claim 4, wherein the reference flux linkage value look-up table selected is based on the slope of the second reference flux linkage value to phase current value curve being greater than the slope of the first reference flux linkage value to phase current value curve.

6. The method as set forth in claim 1, wherein the act of determining a shaft angle further comprises the act of providing a look-up table, wherein the look-up table provides a relationship between the reference flux linkage value, the phase current, and the shaft angle.

7. The method as set forth in claim 6, wherein the act of providing a look-up table is maintained in software.

8. The method as set forth in claim 6, wherein the act of providing the look-up table further comprises the act of providing at least one set of data points defining a phase current value and flux reference linkage value to shaft angle relationship.

9. The method as set forth in claim 6, wherein the act of providing the look-up table further comprises the act of providing at least one set of data points defining a phase current value and reference flux linkage value to shaft angle relationship.

10. A rotor position sensing circuit for a switched reluctance motor, the circuit comprising:
    a measuring circuit to measure phase voltage and phase current;
    a comparator circuit to compare an estimated flux linkage value to a one of a first and second reference flux linkage value that is selected based on the slope between the phase current value and the reference flux linkage value;
    a reference flux linkage value look-up table that is selected based on the slope of the first reference flux linkage value to phase current curve being greater than the slope of the second reference flux linkage value to phase current value curve to determine a shaft angle, the shaft angle being based on the phase current value and the reference flux linkage value; and
    an estimator to determine rotor position based on the shaft angle.

11. The circuit as set forth in claim 10, further comprising a sampler, wherein measurement of the phase current occurs when the estimated flux linkage value is approximately equal to the reference flux linkage value.

12. A switched reluctance motor comprising:
    a stator;
    a rotor; and
    a rotor position sensing circuit, wherein the rotor position sensing circuit further comprises:
        a measuring circuit to measure phase voltage and phase current;
        a comparator circuit to compare an estimated flux linkage value to a one of a first and second reference flux linkage value that is selected based on the slope between the phase current value and the reference flux linkage value;
        a reference flux linkage value look-up table that is selected based on the slope of the first reference flux linkage value to phase current curve being greater than the slope of the second reference flux linkage value to phase current value curve to determine a shaft angle, the shaft angle being based on the phase current value and the reference flux linkage value; and
        an estimator to determine rotor position based on the shaft angle.

13. The circuit as set forth in claim 12, further comprising a sampler, wherein measurement of the phase current occurs when the estimated flux linkage value is approximately equal to the reference flux linkage value.

14. A rotor position sensing circuit for a switched reluctance motor, the circuit comprising:
    first measuring means for measuring a phase voltage;
    second measuring means for measuring a phase current;
    first calculating means for determining an estimated flux linkage value from the phase voltage and the phase current;
    third measuring means for measuring the phase current when the estimated flux linkage value is approximately equal to a reference flux linkage value;
    second calculating means for determining a shaft angle, the shaft angle being based on the reference flux linkage value and the measured phase current value; and
    third calculating means for determining rotor position, the rotor position being based on the shaft angle and the speed.

15. The circuit as set forth in claim 14, wherein the reference flux linkage value is a first flux linkage reference value.

16. The circuit as set forth in claim 14, wherein the reference flux linkage value is a second flux linkage reference value.

17. The circuit as set forth in claim 14, wherein the first calculating means further comprises a look-up table, wherein the look-up table provides a relationship between the reference flux linkage value, the phase current and the shaft angle.

18. The circuit as set forth in claim 17, wherein the look-up table is maintained in software.

19. The circuit as set forth in claim 17, wherein the look-up table further comprises at least one set of data points defining a phase current value and a flux linkage reference value to shaft angle relationship.

20. The circuit as set forth in claim 14, wherein selection of the reference flux linkage value is dependent on the slope between the phase current value and the reference flux linkage value.

21. The circuit as set forth in claim 20, wherein the reference flux linkage value look-up table selected is based on the slope of the first flux linkage reference value to phase current value curve being greater than the slope of the second flux linkage reference value to phase current value curve.

22. The circuit as set forth in claim 20, wherein the reference flux linkage value look-up table selected is based on the slope of the second flux linkage reference value to phase current value curve being greater than the slope of the first flux linkage reference value to phase current value curve.

23. A data processing system for determining rotor position of a switched reluctance motor, the processing system comprising:
   a computer processor for processing data;
   a storage medium for storing data;
   a trigger signal for initializing the storage medium;
   a measuring circuit for processing data regarding measurement of a phase voltage and measurement of a phase current;
   a comparator circuit for processing data regarding the phase voltage and the phase current and for determining an estimated flux linkage value;
   a look-up table circuit for processing data regarding a reference flux linkage value and the measured phase current value and for determining a shaft angle; and
   an integrator circuit for processing data regarding the shaft angle and the speed and for determining rotor position.

24. The system as set forth in claim 23, wherein the reference linkage flux value is a first flux linkage reference value.

25. The system as set forth in claim 23, wherein the reference flux linkage value is a second flux linkage reference value.

26. The system as set forth in claim 23, wherein the look-up table circuit provides a relationship between reference flux linkage value, the phase current value and the shaft angle.

27. The system as set forth in claim 26, wherein the look-up table circuit is maintained in software.

28. The system as set forth in claim 26, wherein the look-up table circuit further comprises at least one set of data points defining a phase current value and reference flux linkage value to shaft angle relationship.

29. The system as set forth in claim 26, wherein selection of the reference flux linkage value is dependent on the slope between the phase current value and the reference flux linkage value to shaft angle relationship.

30. The system as set forth in claim 29, wherein the reference flux linkage value look-up table selected is based on the slope of the first flux linkage reference value to phase current value curve being greater than the slope of the second flux linkage value to phase current value curve.

31. The system as set forth in claim 29, wherein the estimated flux linkage value look-up table selected is based on the slope of the second flux linkage reference value to phase current value curve being greater than the slope of the first flux linkage reference value to phase current value curve.

32. A rotor position sensing circuit for a switched reluctance motor, the circuit comprising:
   a measuring circuit to measure phase voltage and phase current;
   a comparator circuit to compare an estimated flux linkage value to a one of a first and second reference flux linkage value that is selected based on the slope between the phase current value and the reference flux linkage value;
   a reference flux linkage value look-up table that is selected based on the slope of the second reference flux linkage value to phase current curve being greater than the slope of the first reference flux linkage value to phase current value curve to determine a shaft angle, the shaft angle being based on the phase current value and the reference flux linkage value; and
   an estimator to determine rotor position based on the shaft angle.

33. The circuit as set forth in claim 32, further comprising a sampler, wherein measurement of the phase current occurs when the estimated flux linkage value is approximately equal to the reference flux linkage value.

34. A switched reluctance motor comprising:
   a stator;
   a rotor; and
   a rotor position sensing circuit, wherein the rotor position sensing circuit further comprises:
      a measuring circuit to measure phase voltage and phase current;
      a comparator circuit to compare an estimated flux linkage value to a one of a first and second reference flux linkage value that is selected based on the slope between the phase current value and the reference flux linkage value;
      a reference flux linkage value look-up table that is selected based on the slope of the second reference flux linkage value to phase current curve being greater than the slope of the first reference flux linkage value to phase current value curve to determine a shaft angle, the shaft angle being based on the phase current value and the reference flux linkage value; and
      an estimator to determine rotor position based on the shaft angle.

35. The circuit as set forth in claim 34, further comprising a sampler, wherein measurement of the phase current occurs when the estimated flux linkage value is approximately equal to the reference flux linkage value.

* * * * *